United States Patent
Prakash

(10) Patent No.: US 7,239,748 B2
(45) Date of Patent: Jul. 3, 2007

(54) SYSTEM AND METHOD FOR SEGMENTING AN ELECTRONIC IMAGE

(75) Inventor: Ravinder Prakash, Concord, NC (US)

(73) Assignee: International Business Machines Corporation, Armonk, NY (US)

(*) Notice: Subject to any disclaimer, the term of this patent is extended or adjusted under 35 U.S.C. 154(b) by 735 days.

(21) Appl. No.: 10/639,671

(22) Filed: Aug. 12, 2003

(65) Prior Publication Data

US 2005/0036680 A1 Feb. 17, 2005

(51) Int. Cl.
*G06K 9/34* (2006.01)

(52) U.S. Cl. ............... 382/176; 382/173; 382/250

(58) Field of Classification Search ........ 382/100, 382/173, 170, 176, 250; 386/69; 375/240.12, 375/390.1
See application file for complete search history.

(56) References Cited

U.S. PATENT DOCUMENTS

| | | | |
|---|---|---|---|
| 5,101,438 A | 3/1992 | Kanda et al. ............. 382/176 |
| 5,694,170 A * | 12/1997 | Tiwari et al. ............. 348/390.1 |
| 5,828,782 A | 10/1998 | Sunakawa et al. ......... 382/173 |
| 5,995,657 A | 11/1999 | Sunakawa ................ 382/170 |
| 6,008,848 A * | 12/1999 | Tiwari et al. ............ 375/240.12 |
| 6,125,229 A * | 9/2000 | Dimitrova et al. .......... 386/69 |
| 6,154,571 A * | 11/2000 | Cox et al. ................ 382/250 |
| 6,185,329 B1 | 2/2001 | Zhang et al. ............. 382/176 |

FOREIGN PATENT DOCUMENTS

| | | |
|---|---|---|
| JP | 06-292018 | 10/1994 |
| JP | 06-303425 | 10/1994 |
| JP | 06-339019 | 12/1994 |

* cited by examiner

*Primary Examiner*—Anh Hong Do
(74) *Attorney, Agent, or Firm*—Douglas A. Lashmit; Hoffman, Warnick & D'Alessandro LLC

(57) ABSTRACT

A system and method of identifying foreground segments in a JPEG image. The method includes the steps of: selecting a block in the JPEG image; extracting a set of DCT coefficients from the block, wherein the set comprises the first N AC components of the block; computing a sum of the set of DCT coefficients; and analyzing the sum to determine if the block is part of a foreground segment.

18 Claims, 3 Drawing Sheets

SYSTEM AND METHOD FOR SEGMENTING AN ELECTRONIC IMAGE

BACKGROUND OF THE INVENTION

1. Technical Field

The present invention relates generally to a system and method for segmenting an electronic image, and more specifically relates to segmenting electronic images using JPEG DCT coefficient information.

2. Related Art

In order to reduce processing costs, banks and other institutions are seeking to store and process more and more paper documents, including checks, as electronic images. New laws are furthering this movement by, for example, allowing banks to transfer only the check images and associated data for downstream processing. This reduces the requirement for a bank to physically handle and forward paper checks after they are initially received and processed at the bank. However, such scenarios require efficient systems for processing electronic images.

One particular challenge involves capturing information from an electronic image. For instance, in an electronic image of a bank check, the bank may want to identify specific textual or written areas from the check image, such as dollar amounts, signatures, etc. In order to automate this process, foreground elements or segments on the document must be distinguished from the background. Currently there exist numerous solutions in the industry, but most tend to be mathematically complex. For instance, U.S. Pat. No. 5,995,657, "Image Processing Method and Apparatus," issued on Nov. 30, 1999, which is hereby incorporated by reference, utilizes an orthogonal transformation to achieve an image cut out. Such a system requires intensive computations that can substantially increase processing times and costs.

Accordingly, a need exists for a simple and efficient method of segmenting an electronic image to distinguish foreground information from a background region.

SUMMARY OF THE INVENTION

The present invention addresses the above-mentioned problems, as well as others, by providing a system and method for identifying foreground segments in a JPEG compressed image by analyzing DCT frequency data. In a first aspect, the invention provides a method for identifying foreground segments of a JPEG image, comprising: selecting a block in the JPEG image; extracting a set of DCT coefficients from the block, wherein the set comprises the first N AC components of the block; computing a sum of the set of DCT coefficients; and analyzing the sum to determine if the block is part of a foreground segment.

In a second aspect, the invention provides a program product stored on a recordable medium for identifying foreground segments in a compressed electronic image, the program product comprising: means for extracting a set of frequency coefficients from each block of the compressed electronic image, wherein each set comprises the first N frequency coefficients of the block; means for computing a sum of the extracted frequency coefficients for each block; and means for analyzing the sum to determine if the block is part of a foreground segment.

In a third aspect, the invention provides a system for identifying foreground segments of a JPEG image, comprising: a system for extracting a set of DCT coefficients from each block of the JPEG image; a system for computing a sum of the extracted DCT coefficients for each block; and a system for analyzing the sums computed for each block to determine which blocks in the JPEG image are part of a foreground segment.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
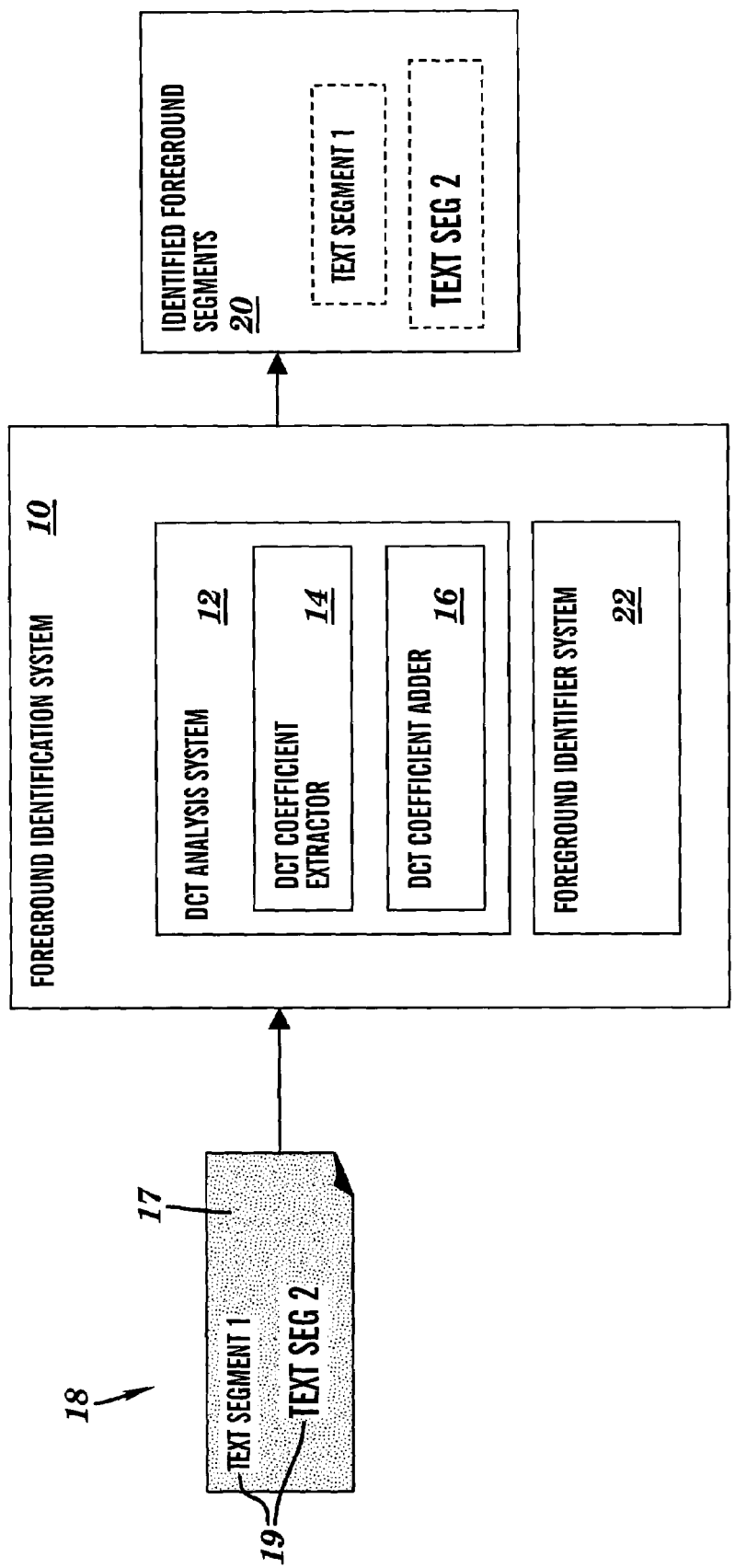
FIG. 1 depicts an image segmentation system in accordance with the present invention.

Referring now to the drawings, FIG. 1 depicts an image segmentation system 10 that receives a compressed electronic image 18, and determines one or more identified foreground segments 20. In an exemplary embodiment, compressed electronic image 18 comprises a JPEG image of a grayscale document. However, it should be understood that electronic image 18 may comprise any type of compressed electronic image in which spatial pixel data is represented as frequency information. In the case of JPEG, the frequency information for each block is represented in the form of 63 discrete cosine transform (DCT) coefficient values (DCT[2] . . . DCT[64]). The first DCT coefficient value, DCT[1], represents an average video value for the block.

As can be seen, the grayscale document includes a background region 17, and one or more foreground segments 19. In this case, the foreground segments 19 comprise textual data. However, it should be understood that other types of foreground segments, such as graphics, pictures, etc., could likewise be identified. As noted above, it is often desirable to be able to identify foreground segments in a compressed electronic image 18, e.g., for processing purposes.

Image segmentation system 10 includes a DCT analysis system 12 and a foreground identifier system 22. DCT analysis system 12 analyzes the DCT coefficients from each block in a JPEG image and assigns a value to each block, in order to distinguish between foreground segments 19 and the background region 17. DCT analysis system 12 includes DCT coefficient extractor 14, which extracts the first N AC components for each block in the JPEG image, i.e., DCT[2] . . . DCT[N+1]. In an exemplary embodiment, DCT coefficient extractor 14 extracts the first sixteen (16) coefficients from each block. However, it should be understood that the number of extracted AC components can vary without departing from the scope of the invention. DCT coefficient adder 16 adds the magnitude of the extracted DCT coefficients for each block. Thus, a value, referred to herein as a "sum" is calculated for each block of the JPEG image, so that sum=DCT[2]+DCT[3] . . . +DCT[N+1], wherein all DCT values are first converted to positive numbers.

An exemplary bank check will typically comprise about 5967 blocks (117×51 blocks). Accordingly, the bank check can be mapped into 5967 values or sums. Once the sums are calculated for each block, foreground identifier system 22 can examine the sums and distinguish between foreground segments 19 and the background region 17. The identified foreground segments 20 can then be output, stored or otherwise processed as needed.

In general, using the above-mentioned algorithm, a block from a foreground segment 19 will have a significantly greater sum than a block from a background region 17. Accordingly, a relatively simple comparison algorithm may be employed by foreground identifier system 22 to accurately recognize blocks that belong to a foreground segment. For instance, in one embodiment, the sum for each block can be compared to the sums for each neighboring block. If a block is found that has a significantly higher sum than that of a neighboring block, then the block can be tagged as belonging to a foreground segment, and the neighboring block can be tagged as belonging to the background region.

In another embodiment, the sum for each block can simply be compared to a predetermined threshold value. If the sum is greater than the threshold value, then the associated block can be tagged as a foreground segment. Alternatively, if the sum is less than the threshold value, then the associated block can be tagged as a background region. As noted above, any methodology can be employed to identify foreground blocks.

Figure 2:
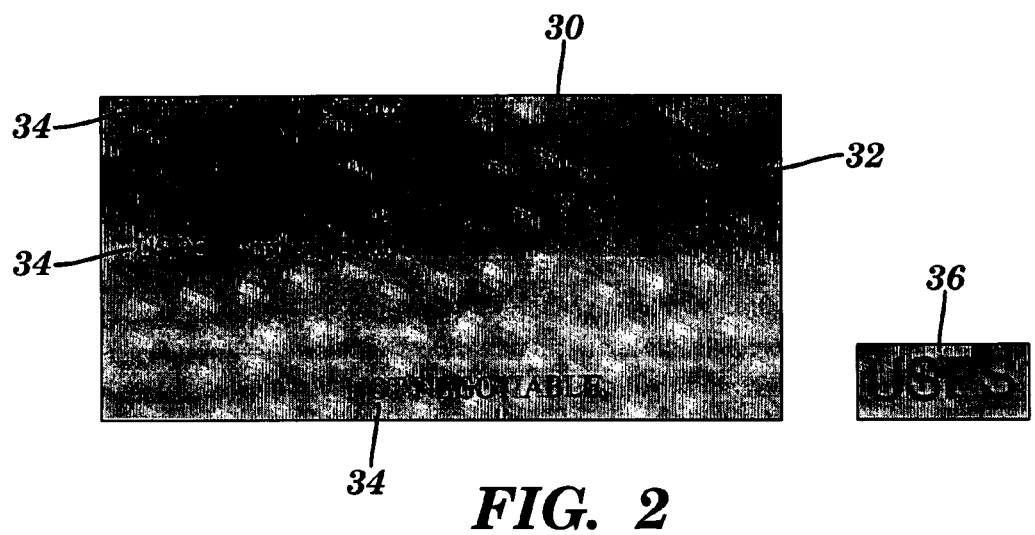
FIG. 2 depicts a grayscale image of a bank check.
Figure 3:
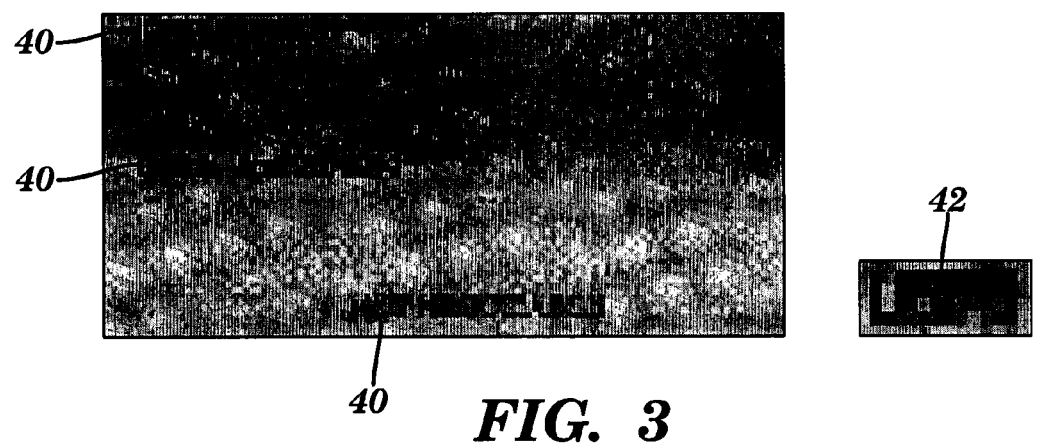
FIG. 3 depicts an image of the bank check of FIG. 1 represented using only first DCT coefficients.
Figure 4:
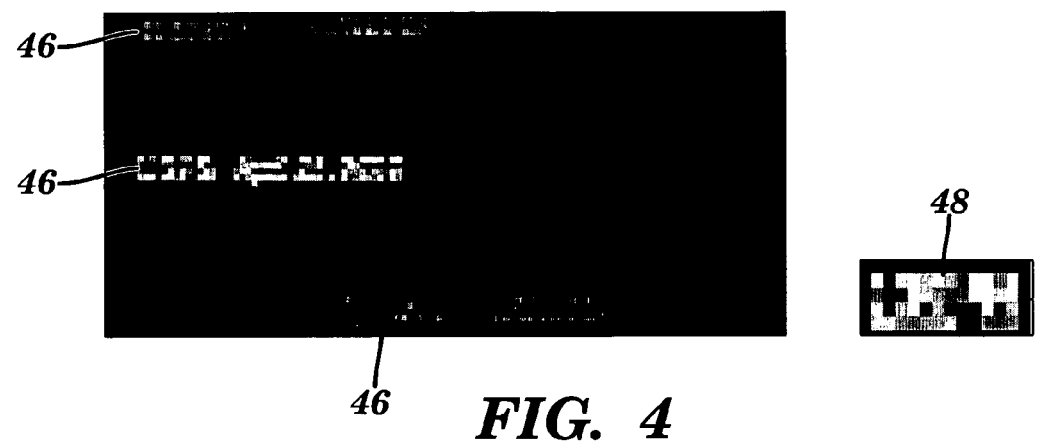
FIG. 4 depicts an image of the bank check of FIG. 1 represented using the sum of AC components of the DCT.

Referring now to FIGS. 2–4, and more particularly FIG. 2, a grayscale image of an exemplary check 30 is shown. The check 30 includes foreground segments 34 and a background region 32. To the right of the check 32, is a small snippet 36 that includes the letters "USPS," cut from the check for exemplary purposes. FIG. 3 depicts a representation 38 of the check 30 using an average video value for each block (i.e., DCT[1], the DC value from each block). As can be seen, the foreground segments 40 do not substantially stand out from the background region. This is also evident in the snippet 42, in which it is hard to distinguish between the foreground letters "USPS" and the background region.

FIG. 4 depicts a representation 44 of the check 30 using the Image Segmentation System 10 described above. In particular, the representation 44 uses a value for each block obtained by summing the first 16 frequency coefficients for each block (i.e., DCT[2] . . . DCT[17]). As is evident, the foreground segments 46 significantly standout from the background region since the signal to noise ratio for the foreground information in the representation 44 is increased in the frequency domain as compared to the average video domain of FIG. 3. This is likewise the case for the snippet 48, in which the foreground information "USPS" can be readily distinguished from the background.

Figure 5:
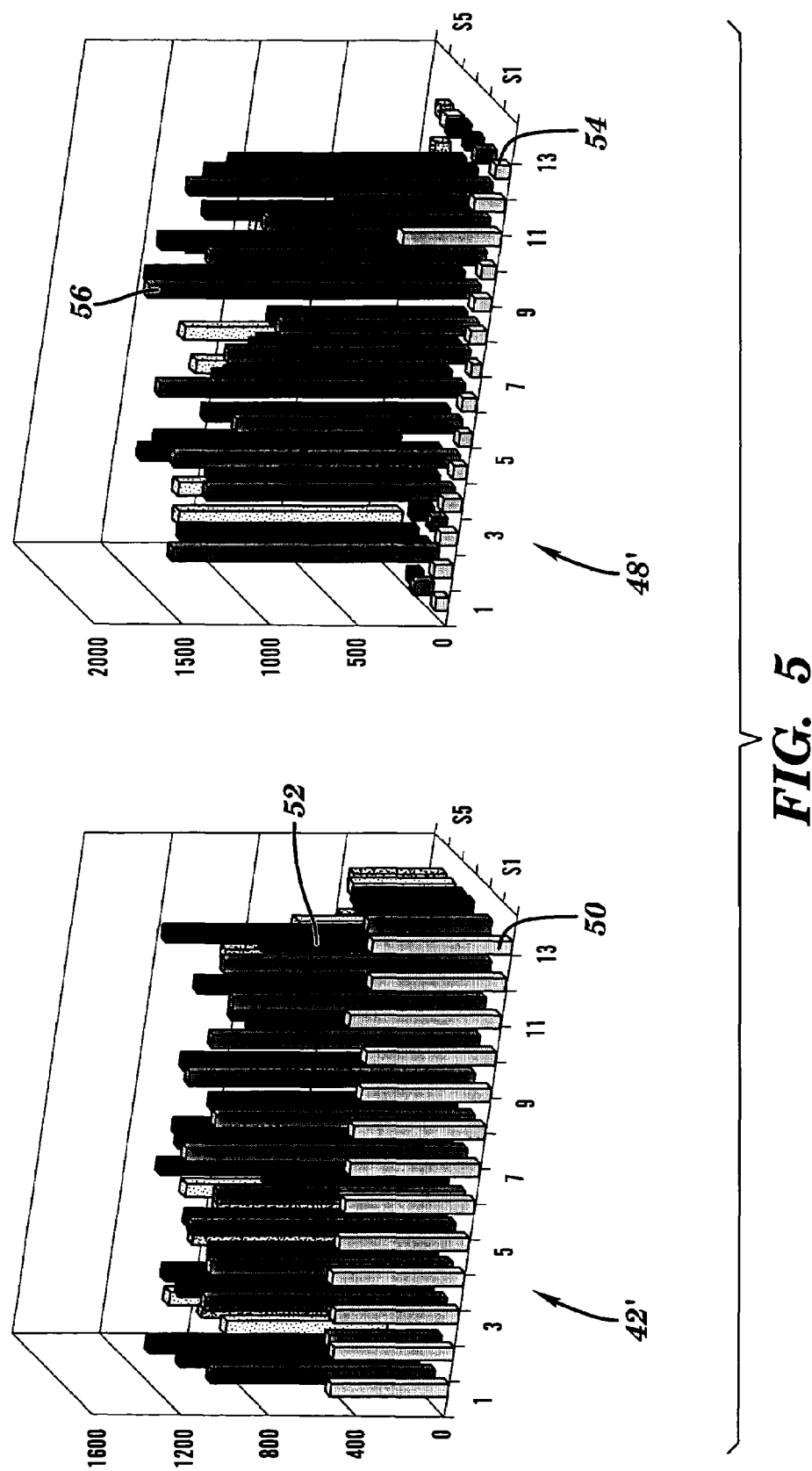
FIG. 5 depicts a pair of graphs showing the value differences between an image represented using only first DCT coefficients, and the sum of AC components of the DCT.

FIG. 5 depicts the corresponding information for the snippets 42 and 48 in a pair of three-dimensional bar charts 42' and 48'. Each bar chart includes 84 values that represent 14×6 blocks required for each snippet. Bar chart 42' corresponds to snippet 42 (average video domain), and bar chart 48' corresponds to snippet 48 (frequency domain). As can be seen, the ability to discriminate between foreground and background blocks is greatly enhanced in bar chart 48', which results from assigning values to blocks utilizing the calculated sums described above. For instance, the difference between a typical background value 50 and foreground value 52 in bar chart 42' is substantially less than the difference between a typical background value 54 and foreground value 56 in bar chart 48'. Accordingly, greater confidence in identifying foreground segments can be achieved by assigning values to blocks using frequency domain components.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method for identifying foreground segments of a JPEG image, comprising:
    selecting a block in the JPEG image;
    extracting a set of DCT coefficients from the block, wherein the set comprises a first N AC components of the block;
    computing a sum of the set of DCT coefficients;
    analyzing the sum to determine if the block is part of a foreground segment; and
    outputting an identified foreground segment.

2. The method of claim 1, wherein the JPEG image comprises a compressed image of a bank check.

3. The method of claim 1, wherein N is 16.

4. The method of claim 1, wherein the step of analyzing the sum to determine if the block is part of a foreground segment includes the step of comparing the sum to a threshold value.

5. The method of claim 1, comprising the further step of computing a sum for each block in the JPEG image.

6. The method of claim 5, wherein the step of analyzing the sum to determine if the block is part of a foreground segment includes the step of comparing the sum to a second sum computed for a neighboring block.

7. The method of claim 6, wherein the step of analyzing the sum to determine if the block is part of a foreground segment includes the further step of identifying the block as part of a foreground segment if the value of the sum is substantially larger than the value of the second sum.

8. A program product stored on a recordable medium for identifying foreground segments in a compressed electronic image, the program product comprising:

means for extracting a set of frequency coefficients from each block of the compressed electronic image, wherein each set comprises a first N frequency coefficients of the block;

means for computing a sum of the extracted frequency coefficients for each block;

means for analyzing the sum to determine if the block is part of a foreground segment; and means for indicating that the block is part of a foreground segment.

9. The program product of claim 8, wherein N is 16.

10. The program product of claim 8, wherein the set of frequency coefficients comprises JPEG DCT components.

11. The program product of claim 8, wherein the means for analyzing the sum to determine if the block is part of a foreground segment compares the sum to a second sum computed for a neighboring block.

12. The program product of claim 8, wherein the means for analyzing the sum to determine if the block is part of a foreground segment compares the sum to a threshold value.

13. A system for identifying foreground segments of a JPEG image, comprising:

a system for extracting a set of DCT coefficients from each block of the JPEG image;

a system for computing a sum of the extracted DCT coefficients for each block; and a system for analyzing the sum computed for each block to determine which blocks in the JPEG image are part of a foreground segment.

14. The system of claim 13, wherein each set comprises a first N AC components of the block.

15. The system of claim 14, wherein N is 16.

16. The system of claim 13, wherein the system for analyzing the sum computed for each block to determine which blocks in the JPEG image are part of a foreground segment compares a first sum for a first block to a second sum for a neighboring block.

17. The system of claim 16, wherein the system for analyzing identifies the first block as part of a foreground segment if the first sum is substantially greater than the second sum.

18. The system of claim 13, wherein the system for analyzing the sum computed for each block to determine which blocks in the JPEG image are part of a foreground segment compares each sum to a threshold value.

* * * * *